US007551931B2

(12) United States Patent
Walczak et al.

(10) Patent No.: US 7,551,931 B2
(45) Date of Patent: Jun. 23, 2009

(54) METHOD AND SYSTEM FOR VALIDATING A MOBILE STATION LOCATION FIX

(75) Inventors: Thomas J. Walczak, Woodstock, IL (US); William P. Alberth, Jr., Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 490 days.

(21) Appl. No.: 09/769,122

(22) Filed: Jan. 24, 2001

(65) Prior Publication Data

US 2002/0098851 A1 Jul. 25, 2002

(51) Int. Cl.
*H04Q 7/20* (2006.01)
(52) U.S. Cl. .................... 455/456.5; 455/414.2
(58) Field of Classification Search .............. 455/456.1, 455/12.1, 427; 342/357.01–357.14
See application file for complete search history.

(56) References Cited

U.S. PATENT DOCUMENTS

| | | | | |
|---|---|---|---|---|
| 5,043,736 A | * | 8/1991 | Darnell et al. ............ 342/357.1 |
| 5,625,668 A | * | 4/1997 | Loomis et al. ........... 455/456.5 |
| 5,857,155 A | * | 1/1999 | Hill et al. ................. 455/456.3 |
| 5,906,655 A | * | 5/1999 | Fan ............................ 701/216 |
| 5,917,449 A | * | 6/1999 | Sanderford et al. ......... 342/457 |
| 5,982,324 A | | 11/1999 | Watters et al. ......... 342/357.06 |
| 6,058,338 A | | 5/2000 | Agashe et al. ................ 701/13 |
| 6,081,229 A | | 6/2000 | Soliman et al. ........ 342/357.05 |
| 6,166,691 A | | 12/2000 | Lindqvist |
| 6,225,945 B1 | * | 5/2001 | Loomis .................. 342/357.12 |
| 6,249,245 B1 | | 6/2001 | Watters et al. |
| 6,252,543 B1 | | 6/2001 | Camp |
| 6,282,426 B1 | | 8/2001 | Wang |
| 6,366,240 B1 | | 4/2002 | Timothy et al. |
| 6,411,811 B2 | * | 6/2002 | Kingdon et al. .......... 455/456.5 |
| 6,480,147 B2 | * | 11/2002 | Durst et al. ............ 342/357.07 |
| 6,496,778 B1 | * | 12/2002 | Lin .............................. 701/215 |
| 6,516,197 B2 | * | 2/2003 | Havinis et al. ........... 455/456.1 |
| 6,539,230 B2 | * | 3/2003 | Yen ......................... 455/456.1 |
| 6,560,462 B1 | * | 5/2003 | Ravi et al. ................ 455/456.1 |
| 6,625,457 B1 | * | 9/2003 | Raith ....................... 455/456.1 |
| 6,650,948 B1 | * | 11/2003 | Atkinson et al. ........ 340/995.13 |
| 2001/0052849 A1 | * | 12/2001 | Jones, Jr. .................. 340/572.1 |
| 2002/0055817 A1 | * | 5/2002 | Chou .......................... 701/207 |
| 2002/0068580 A1 | * | 6/2002 | Bala et al. ................... 455/456 |
| 2002/0164993 A1 | * | 11/2002 | Elliot ......................... 455/456 |
| 2002/0198001 A1 | * | 12/2002 | Bajikar ....................... 455/456 |

* cited by examiner

*Primary Examiner*—Sam Bhattacharya
(74) *Attorney, Agent, or Firm*—Roland K. Bowler, II

(57) ABSTRACT

A method and system for evaluating the validity of location fixes of a mobile station by comparison of a location fix for which a validity determination is desired with one or more prior reference location fixes. In one embodiment, a satellite positioning system based location fix of a satellite positioning system enabled cellular mobile station in a cellular communications network is validated by comparison of the satellite positioning system based location fix to one or more of a plurality of network based location fixes, or to an estimated future location fix of the mobile station.

20 Claims, 3 Drawing Sheets

METHOD AND SYSTEM FOR VALIDATING A MOBILE STATION LOCATION FIX

FIELD OF THE DISCLOSURE

The present disclosure relates generally to locating mobile stations, and more particularly to evaluating the validity of mobile station location fixes, for example the validity of a GPS based location fix of a cellular handset in a cellular communications network.

BACKGROUND

The terrestrial positioning of cellular telephone handsets in cellular communications networks with sufficient accuracy to support enhanced emergency 911 (E-911) services will soon be mandatory in the United States of America. Non-regulatory, market driven forces are also motivating communications equipment manufacturers and service providers to more accurately locate cellular telephone handsets and other mobile stations, for example to provide promotional and fee based value-added services.

Network based schemes for locating cellular handsets in cellular communications networks are known generally, for example those based on signals received at the mobile station from several neighboring cellular base stations as the mobile station moves about the cellular communications network. Known network based mobile station location determinations include, among others, those based on signal strength measurements, or on Angle of Arrival (AOA) measurements, or on Time of Arrival (TOA) measurements, or on Enhanced Observed Time of Arrival (EOTD) measurements, or on Time Difference of Arrival (TDOA) measurements, or on Advanced Forward Link Triangulation (AFLT) measurements, among others.

Network based mobile station location determinations however are subject to inaccuracies and positioning error. In some networks, for example, handset power limitations and the inability of the handset to maintain constant communication with a sufficient number base stations, among other factors, limits the accuracy of network based location determinations. See generally, U.S. Pat. No. 6,081,229 entitled "System and Method For Determining The Position Of A Wireless CDMA Transceiver".

Another approach to determining the location or position of cellular handsets is the use of satellite based positioning systems, which are generally capable of providing longitude, latitude, altitude and velocity information about the mobile station, although in some cellular handset positioning applications only longitude and latitude coordinates are required. Satellite based terrestrial position determinations are made generally by acquiring satellite data, with a satellite receiver integrated in the mobile station, from several satellites among a constellation of satellites. Known satellite positioning systems include the Navigation System with Time and Range (NAVSTAR) Global Positioning System (GPS) in the United States of America, and the Global Orbiting Navigation System (GLONASS) in Russia.

In cellular communications network applications, it is also known to generate satellite based location fixes with assistance from the communications network. See, for example, U.S. Pat. No. 6,058,338 entitled "Method and Apparatus For Efficient GPS Assistance In A Communications System" and U.S. Pat. No. 5,982,324 entitled "Combining GPS With TOA/TDOA Of Cellular Signals To Locate Terminal".

Satellite positioning system based position determinations are also subject to inaccuracies and positioning error. In cellular and other mobile station positioning applications, mobile station location error may result from obstruction of satellite and any terrestrial based assistance signals, for example by obstacles in urban canyons, and from signal propagation delay, among other factors.

BRIEF DESCRIPTION OF THE DRAWINGS

The present inventions will become more fully apparent to those having ordinary skill in the art upon careful consideration of the following Detailed Description thereof in conjunction with the accompanying drawings, which are described below.

DETAILED DESCRIPTION

In one embodiment, generally, a non-network based location fix, for example a satellite positioning system based location fix, of a cellular telephone handset, referred to herein more generally as a "mobile station", in a cellular communications network, is validated by comparison of the satellite positioning system based location fix to one or more prior location fixes, for example prior network based location fixes, or an estimated future location fix. In another cellular handset location validation application, the location fix for which a validation determination is desired may be a network based location fix, which is compared to one or more prior network based location fixes or an estimated future location fix.

More generally, the disclosure has application to validating location fixes of any mobile station, and thus is not limited to validating location fixes of cellular handsets in cellular communications networks. Alternative applications include, for example, the validation of GPS based location fixes in GPS navigation devices and other satellite positioning system enabled hand-held devices, also referred to herein to more generally as "mobile stations", by comparison of a satellite positioning system based location fix for which a validity determination is desired to one or more prior satellite positioning system based location fixes or to an estimated future location fix.

Still more generally, any location fix of any mobile station may be validated by comparison thereof to one or more prior or estimated future location fixes of the mobile station, which may be acquired by the same or by different location determination methods or means. Thus the present disclosure has other applications not limited to handheld or battery operated mobile stations. These other applications include, for example, surveillance, locating and monitoring freight and valuable assets, among many others.

In the exemplary embodiment, the non-network based location fix is a satellite or global positioning system based location fix. Known exemplary satellite or global positioning systems suitable for this purpose include, among others, the Navigation System with Time and Range (NAVSTAR) system in the United States of America, and the Global Orbiting Navigation System (GLONASS) in Russia. The satellite based positioning fix may be obtained autonomously or with assistance from one or more terrestrial base stations.

In other embodiments of the invention, the non-network based mobile station location fix may be based alternatively on a location positioning system other than a satellite positioning system, including for example, but not limited to, LORAN and other radio based navigation systems.

Figure 1:
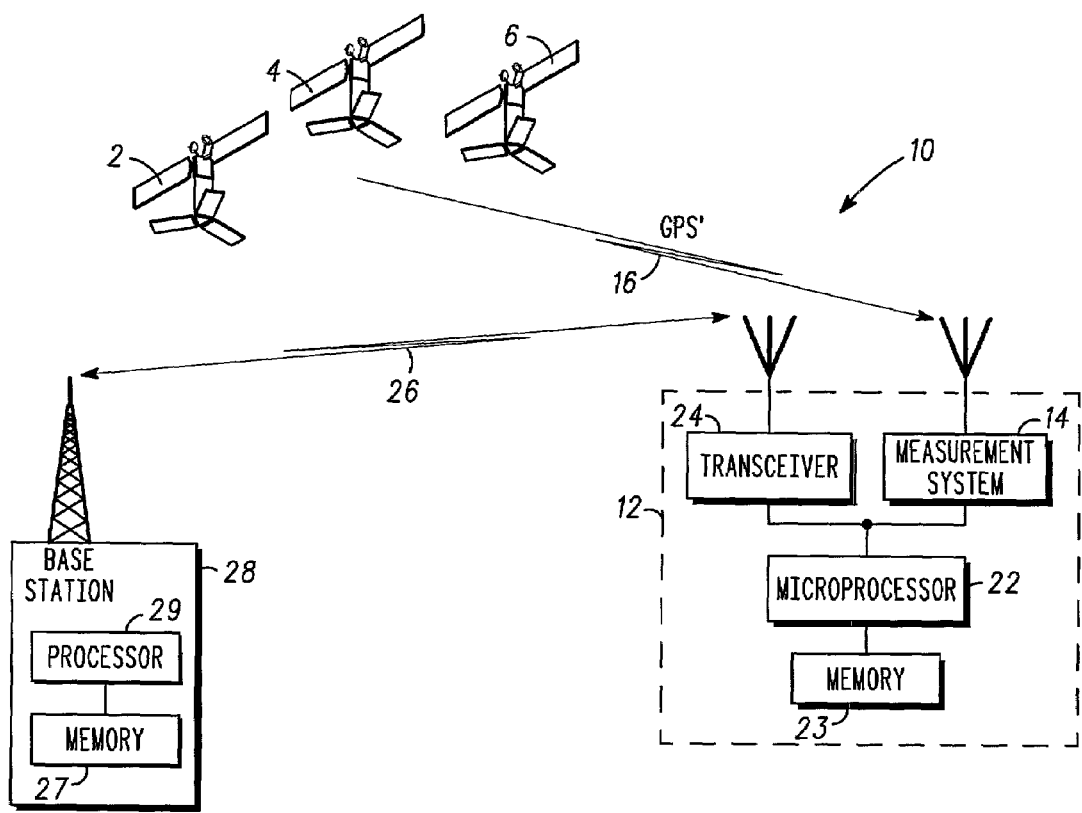
FIG. 1 illustrates a mobile station in communication with several satellites of a satellite positioning system and a base station of a communications network.

FIG. 1 illustrates a system 10 for obtaining and validating a satellite or global positioning system (GPS) based location fix of a cellular telephone handset, or mobile station, 12 in a cellular communications network.

Figure 2:
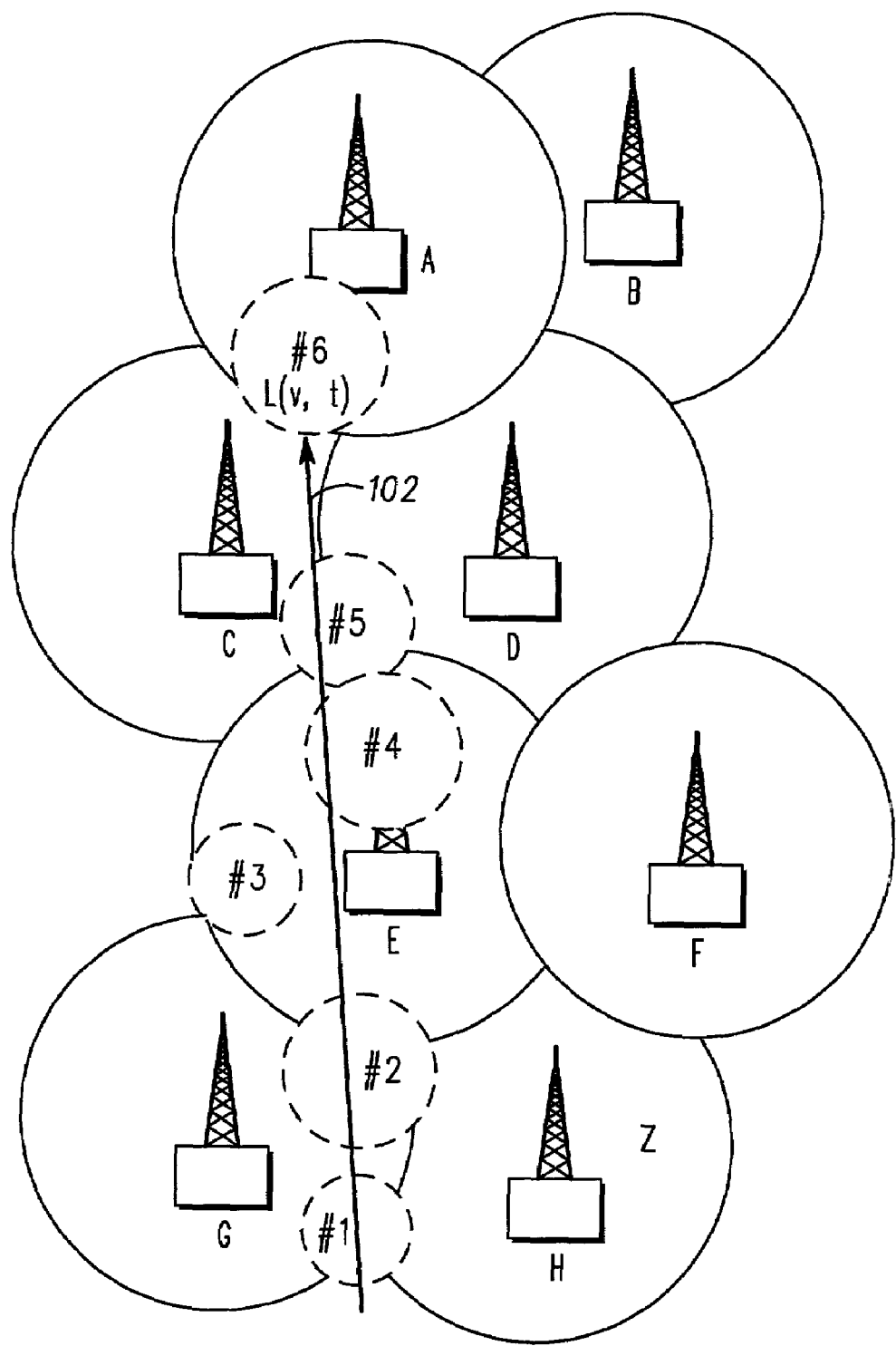
FIG. 2 illustrates a process flow diagram according to an exemplary embodiment.

In FIG. 2, the cellular communications network generally comprises a plurality of cells, including cells A, B, C, D, E, F, G and H, each having a corresponding cellular base station, only one of which, base station 28, is illustrated in FIG. 1.

In FIG. 1, the satellite positioning system generally comprises a plurality or constellation of earth orbiting satellites, only some of which (satellites 2, 4 and 6) are illustrated.

In FIG. 1, the exemplary mobile station 12 comprises generally a satellite positioning system signal reception interface, for example, a GPS receiver measurement system (MS) 14, for receiving GPS signals 16 from which GPS based mobile station location fixes are determined, either autonomously or with assistance from the cellular communications network or with assistance from some other network, for example differential global positioning systems (DGPS), as is well known by those having ordinary skill in the art.

The mobile station 12 also comprises generally a wireless communications network interface, for example, a receiver/transmitter (TXVR) 24, for communicating with the cellular communications network, for example communications 26 to and/or from the base station 28, which may be a serving or neighboring base station, as the mobile stations moves about the communications network. In some embodiments, the mobile station does not include the wireless communications interface.

The mobile station also comprises generally a processor 22 having memory 23 associated therewith, which in some embodiments accommodates the storage of mobile station location information or data from which said information may be derived. The processor 22 is coupled to the MS 14 and the TXVR 24 for processing information in association therewith.

In the exemplary cellular communications network mobile station positioning application, the mobile station 12 samples signals from neighboring cells as the mobile station moves about the cellular communications network to obtain neighboring base station identification, signal strength and other signal information, which is communicated from the mobile station to the serving base station for managing hand-offs between serving cells, as is known generally. This information is generally stored in a look-up table, for example at the serving base station or in the mobile station.

In some embodiments, neighboring base station signal data routinely sampled by the mobile station for use in hand-offs between server stations forms a basis for acquiring signal data of the neighboring base stations from which network based mobile station location estimates and other information may be determined. Mobile station location estimates may be based for example on signal strength measurements.

In other embodiments, the sampling of signals from neighboring base stations from which mobile station location determinations may be made departs from the routine sampling performed by the mobile station for server station hand-offs, for example the sampling rate may be increased to provide more frequent network based mobile station determinations. Alternatively, the sampling of the neighboring base stations may be unrelated to the routine base station identification and signal strength determinations, and may instead be for the sole purpose of estimating the mobile station location by a network based location method. The process flow diagram of FIG. 1 illustrates the sampling of neighboring base station signals at sampling block 200.

In one embodiment, the neighboring base station signal data derived from signals sampled by the mobile station is used for determining, at least roughly, the location information of the mobile station, and in some embodiments a direction of travel and/or approximate speed or velocity information of the mobile station. The process flow diagram of FIG. 3 illustrates the derivation of information of the mobile station, e.g., the position thereof, based on the neighboring base station signals at deriving block 210, but this step includes more generally the derivation of any other information of the mobile station based on the sampled signals of the base stations.

In some embodiments, a time attribute, for example the time of acquisition of the signal, is associated with the location or position or speed or velocity information derived from the sampled signals or with the signal data from which the information is derived. In other embodiments, the stored information or signal data from which the information is derived has associated therewith an order attribute indicative of the order in which the signal data was sampled or the order in which the information based thereon was derived. Alternatively, the order of signal acquisition may be maintained by ordering the storage thereof, for example, the earliest derived network based location stored in a first memory location and the most recently derived network based location stored in a latter memory location. A history of the mobile station location fixes may thus be derived or generated and stored, thereby providing a reference against which more recent mobile station location fixes may be compared for validity evaluation. Alternatively, the history may form the basis for the estimation of future mobile station location fixes, against which more recent mobile station location fixes may be compared for validity evaluation.

Figure 3:
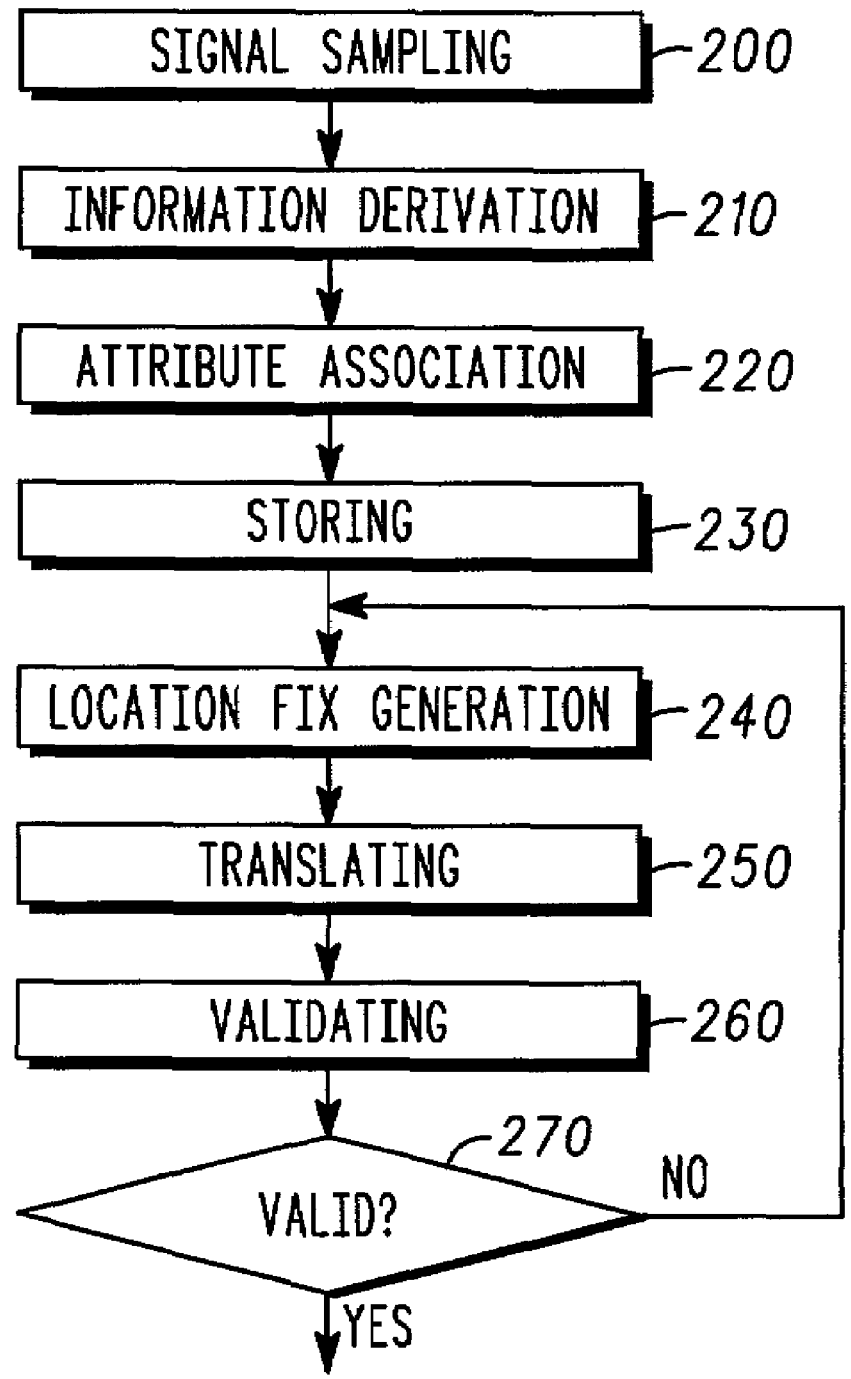
FIG. 3 illustrates a map of a cellular communications network, or system, with a history of mobile station location fixes, an estimated future location fix, and another location fix for which a validity determination is desired.

FIG. 3 illustrates the association of an attribute to information derived from the signals of the neighboring base stations at the associating block 220, but this optional step may occur alternatively between the sampling and derivation steps, i.e., between blocks 200 and 210, in embodiments where the attribute is associated with the signal parameter data from which the mobile station information, e.g., position, is derived, rather than being associated with the information per se.

In one embodiment, the specific information derived from the sampled base station signals and any attribute associated therewith is stored, for example in the memory 23 of the mobile station or in the memory 27 of the base station 28. The stored information derived from the sampled base station signals may be, for example, the position and/or direction and/or velocity and/or speed information of the mobile station. This storing step is illustrated at storing block 230 in FIG. 3.

In another embodiment, the base station signal parameter data received by the mobile station and any attribute associated therewith is stored as it is received for subsequent processing, for example, processing to determine location and/or direction and/or velocity information of the mobile station. In this alternative embodiment, the storage step, at block 230, occurs before the information derivation step, at block 210.

In one embodiment, one or more mobile station location determinations are made based on the strength of signals received at the mobile station from several neighboring base stations. In one embodiment, this information is derived from the look-up table used routinely for cellular station hand-off operations. More generally, the signal strength based location fixes of the mobile station, or the signal data from which they are derived, are stored in some other dedicated memory location for comparison with some later derived location fix for which a validity determination is desired, as discussed further below.

In other embodiments, location determinations or fixes of the mobile station are obtained based on a time related parameter of the network base station signals received at the mobile station, for example, based on Time of Arrival (TOA) measurements, or on Enhanced Observed Time of Arrival (EOTD) measurements, or on Time Difference of Arrival (TDOA) measurements, among others.

In other embodiments, location fixes of the mobile station are obtained based on some other parameter of the network base station signals received at the mobile station, for example based on Angle of Arrival (AOA) measurements, or on Advanced Forward Link Triangulation (AFLT) measurements, among other network based mobile station location fixation methods.

Generally, a plurality of network based mobile station location fixes, or the signal data from which they are derived, are stored either in the mobile station or in one of the base stations or at some other location for comparison with a later derived location fix for which a validity determination is desired, as discussed below.

In one embodiment, the mobile station samples signals or parameters thereof from neighboring base stations, which are useful for determining location fixes of the mobile station as the mobile station moves about the cellular communications network, as discussed above.

In FIG. 2, positions of the mobile station in a communications network is indicated by a plurality of circles having numerals 1-5, with an earliest position fix 1 located somewhere between cells G and H, and subsequent location fixes 2-5 located in cells E and C, suggesting that the mobile station is moving generally toward cell A.

In FIG. 2, the radius of each location fix, 1-5, is indicative of the uncertainty or likely error thereof. The location fix uncertainty depends on a number of factors, for example the particular method by which the location fix is determined, signal strength and other factors known to those having ordinary skill in the art. Generally, the larger the radius of the circle associated with each location fix, the greater the error associated therewith. The uncertainty information, if known, may be stored as an error attribute in association with the network based location fix in embodiments where mobile station location fix is stored, as discussed above.

FIG. 3 illustrates the generation of a non-network based, e.g., a GPS based, mobile station location fix at block 240. The exemplary GPS based location fix may be generated autonomously or with assistance, including but not limited to network assistance and DGPS. As noted above, alternatively, the non-network based location fix may be a LORAN based fix or some other mobile station location fix not based on the communications network. More generally, however, block 240 is indicative of the generation of a mobile station location fix by any method or means for which a validity determination is required. For example, the location fix generated at block 240 may also be a network based location fix.

In one embodiment, the validity of the GPS based location fix is evaluated by comparing it to or with one or more prior network based location fixes, as indicated at block 260 of FIG. 2. The comparison may be performed by the processor 22 of the mobile station 12 or by the processor 29 of one of the base stations, for example the serving base station or it may be performed at some other location where this data is stored.

Where the comparison is made may depend on factors such as the storage location of the network based location fixes or the signal data from which the network based location fixes are derived, the availability of processing capacity, the location where the validity information is required, e.g., at an E-911 emergency operator's station, etc.

In embodiments where the prior location fixes are in a form different than the location fix for which the validity determination is desired, the location fixes are generally translated into a common location form, or coordinate system, prior to comparison, as illustrated at block 250 of FIG. 3. GPS based location fixes, for example, are in longitude and latitude coordinates. In one embodiment, the one or more network based mobile station location fixes are translated from their native form to longitude and latitude coordinates prior to comparison with the GPS based longitude and latitude coordinate fix. The translation of the one or more network based location fixes may be performed prior to storage thereof or just prior to comparison with the GPS based location fix. Alternatively, the GPS based location fix is translated into the coordinate form of the network based location fixes.

In one embodiment, the network based location fix is merely the identification of the base station serving the mobile station, which indicates roughly that the location of the mobile station is likely within the cellular geography of the server base station, the coordinates of which are known. Gross errors in the GPS based location fix may be identified with this rough network based mobile station location information. Particularly, if the GPS based location fix is outside the roughly estimated range of the network based mobile station location fix, the GPS location fix may be considered invalid. If the GPS location fix is inside the roughly estimated range of the mobile station, the GPS based location fix may be considered valid.

As discussed, network based mobile station location fixes may be obtained by sampling signals from several neighboring base stations, thereby relatively accurately locating the mobile station within a region of uncertainty within a particular cell of the communications network, for example, as illustrated in FIG. 2. Thus in some embodiments, if the GPS based location fix of the mobile station is within a specified distance or range of the network based mobile station location fix, the GPS based location fix may be considered valid. However, if the GPS location fix is outside the specified range of the network based location fix, the GPS based location fix may be considered invalid.

In some embodiments, the acceptable range within which the location fix for which a validity determination is required is considered valid is based upon, or is a function of, an interval of time that passes between generation of the reference location fix and the location fix for which the validity determination is desired. Generally, the greater the time interval, the greater the acceptable range within which the location fix for which the validity determination is required will be considered valid, since the mobile station may move greater distances during longer time intervals. The time interval may be measured or estimated.

The acceptable range within which the location fix for which a validity determination is required is considered valid may be a function of the velocity of the mobile station, in addition to the time interval consideration discussed above. The velocity of the mobile station may be estimated based upon prior locations fixes or on other known means, for example the fading pitch of one or more cellular channels.

In another embodiment, the validity of the GPS based mobile station location fix is determined by comparison thereof to a plurality of network based location fixes. If the GPS based location fix is located nearer more recent network based location fixes than it is to earlier network based location fixes, or if it is within a specified range of a most recent location fix, then it may be considered valid. Conversely, if the GPS based location fix is located farther from more recent network based location fixes than it is to earlier network based location fixes, or if it is outside some specified range, then it may be considered invalid.

In other embodiments, an estimated path and in some embodiments a direction of travel of the mobile station, indicated by line 102 of FIG. 2, may be determined based on the prior mobile station position determinations, for example by a least-squares or some other path approximating method. Future estimated locations of the mobile station are predicted by extrapolation along the estimated path. In FIG. 2, for example, the estimated future position fix 6, L(v,t), is extrapolated along the estimated path 102 some distance based on the time interval and velocity variables. The location fix for which a validity determination is required may thus be validated by comparison thereof to the estimated location fix of the mobile station.

An acceptable validity range may thus be defined based on the estimated future position of the mobile station, wherein mobile station location fixes inside the acceptable range are considered valid and those outside the range are invalid.

In some embodiments, a most recently generated network based location fix is compared to prior generated network based location fixes to assess the validity of the most recent network based location fix by any one or more of the methods discussed above. Erroneous or questionable location fixes may be discarded during the evaluation of subsequent location fixes.

In FIG. 2, a location fix Z for which a validity determination is required is nearer earlier generated location fixes 1 and 2 than it is to more the recently generated location fixes 4 and 5, and thus the location fix Z may be considered invalid. The location fix Z also may be considered invalid for its location outside an acceptable range associated with the most recently generated reference location fix 5. The location fix Z may also be considered invalid for its location outside an acceptable range associated with the estimated future location fix 6, if such a fix is estimated.

Whether or not a location fix is valid or invalid is largely subjective, and generally location fix validity determinations will be assessed based on the requirements of the particular application. The limits of acceptable ranges of the mobile station location may readily be programmed in software.

In some applications, the determination of whether a location fix is valid may be determined manually, for example, by visually displaying the location fix for which a validation determination is desired and the one or more prior location fixes forming a basis for a comparative reference on a map for evaluation by an individual. This displayed form of location information may be useful, for example, for E-911 operators charged with locating a mobile station and instructing emergency response personnel to the mobile station location.

Generally, where the mobile station location fix is considered invalid, another location fix may be initiated as indicated at decision block 270 in FIG. 3 or the invalid or suspect mobile station location fix may be disregarded. In embodiments, where validity determinations are made manually, the party making the validity determination may initiate another location fix, for example an E-911 operator may initiate another GPS based position fix where the prior GPS based position fix was suspect.

While the present invention has been described hereinabove to enable those of ordinary skill in the art to make and use what is presently considered to be the best modes thereof, those of ordinary skill will understand and appreciate that equivalents, modifications and variations may be made thereto without departing from the scope and spirit thereof, which is to be limited not by the exemplary embodiments disclosed herein but by the appended claims.

What is claimed is:

1. A method for validating a non-network based location fix of a mobile station, comprising:

generating a non-network based location fix of the mobile station;

evaluating the validity of the non-network based location fix of the mobile station by determining whether the non-network based location fix is within a specified range of a prior location fix, the specified range based on an estimated velocity of the mobile station and a time interval between the generation of the prior location fix and the non-network based location fix.

2. The method of claim 1, generating the non-network based location fix includes receiving global positioning system signals at the mobile station.

3. The method of claim 1, generating the prior location fix by measuring a time related parameter of signals received at the mobile station from several base stations neighboring the mobile station.

4. The method of claim 3, translating the prior location fix and the non-network based location fix into a common format prior to comparing the prior network and non-network based location fixes.

5. The method of claim 1, the communications network having a plurality of base stations, generating the prior location fix by measuring at the mobile station several base station signals neighboring the mobile station, evaluating the validity of the non-network based location fix by determining whether the non-network based location fix is within a specified range of the prior location fix.

6. The method of claim 1, evaluating the validity of the non-networked based location fix by comparing it to at least one of a plurality of prior network based location fixes.

7. The method of claim 1, estimating a future location fix of the mobile station based on a plurality of prior location fixes, evaluating the validity of the non-networked based location fix by determining whether the non-network based location fix is within a specified range of the estimated location fix.

8. A method for validating a satellite positioning system based location fix of a satellite positioning system enabled cellular mobile station, comprising:

generating a satellite positioning system based location fix of the mobile station;

ordering a plurality of prior location fixes by applying a corresponding time of acquisition attribute thereto;

evaluating the validity of the satellite positioning system based location fix by comparing the satellite positioning system based location fix to at least one of the plurality of time stamped prior location fixes.

9. The method of claim 8, generating the prior location fixes by measuring at the mobile station a time related parameter of signals received from a plurality of cellular base stations of the cellular communications network neighboring the mobile station.

10. The method of claim 8,
evaluating the validity of the satellite positioning system based location fix by determining whether the satellite positioning system based location fix is within a specified range of the at least one prior location fixes,
defining the specified range based on an estimated velocity of the mobile station and a time interval between generation of the at least one prior network based location fix and the satellite positioning system based location fix.

11. The method of claim 8, evaluating the validity of the satellite positioning system based location fix by comparing it to more than one of the plurality of time stamped prior location fixes.

12. The method of claim 8, generating a subsequent satellite positioning system based location fix of the mobile station if a prior satellite positioning system based location fix is invalid.

13. A method for validating a location fix of a mobile station, comprising:
generating a plurality of location fixes of the mobile station;
estimating a future position fix of the mobile station based on the plurality of location fixes;
evaluating the validity of a recently generated location fix of the mobile station by determining whether it is within a specified range of the estimated future position fix of the mobile station.

14. The method of claim 13, estimating a velocity of the mobile station, defining the specified range based on the estimated velocity and time interval.

15. A cellular mobile station, comprising:
a satellite positioning system signal reception interface in the mobile station for receiving satellite positioning system signals;
a cellular communications network interface in the mobile station for communicating with a cellular communications network;
an information processor coupled to the satellite positioning system signal reception interface and the cellular communications network interface,
the information processor for evaluating the validity of a satellite positioning system based location fix based on at least one prior mobile station location fix stored in memory.

16. The mobile station of claim 15, the at least one prior mobile station location fix is a network based mobile station location fix, the information processor for determining the network based mobile station location fix based on cellular base station signal strength data received by the cellular communications network interface.

17. The mobile station of claim 15, the information processor for determining a network based mobile station location fix based on a timing relationship between cellular communication network signals received by the cellular communications network interface, the information processor for evaluating the validity of a satellite positioning system based location fix by comparing it to at least one prior network based mobile station location fix.

18. The mobile station of claim 15, the information processor for estimating a future position fix of the mobile station and evaluating the validity of the satellite positioning system based location fix by determining whether it is within a specified range of the estimated future position fix.

19. The mobile station of claim 15, the information processor for evaluating the validity of a satellite positioning system based location fix by determining whether it is within a specified range of at least one prior mobile station location fix.

20. The mobile station of claim 15, the information processor for evaluating the validity of the satellite positioning system based location fix by determining whether it is closer to a more recent prior location fix than it is to a less recent prior location fix.

* * * * *